April 3, 1934.  R. M. JOHNSON,  1,953,828
VALVE FOR WELLS
Filed April 15, 1933  4 Sheets-Sheet 2
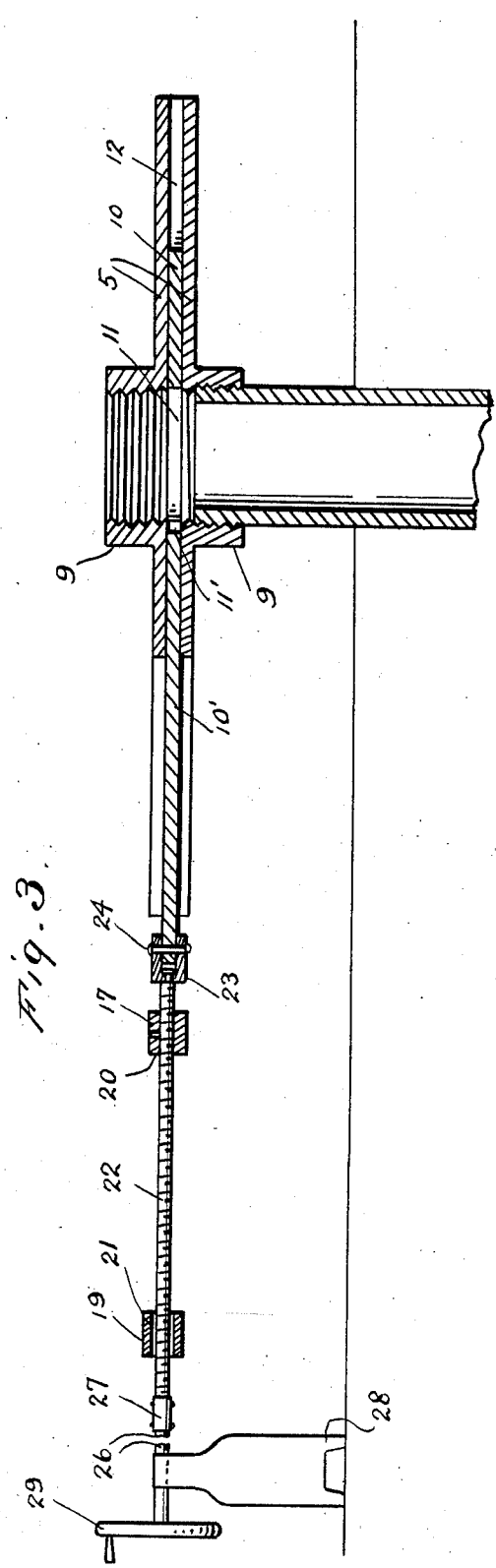
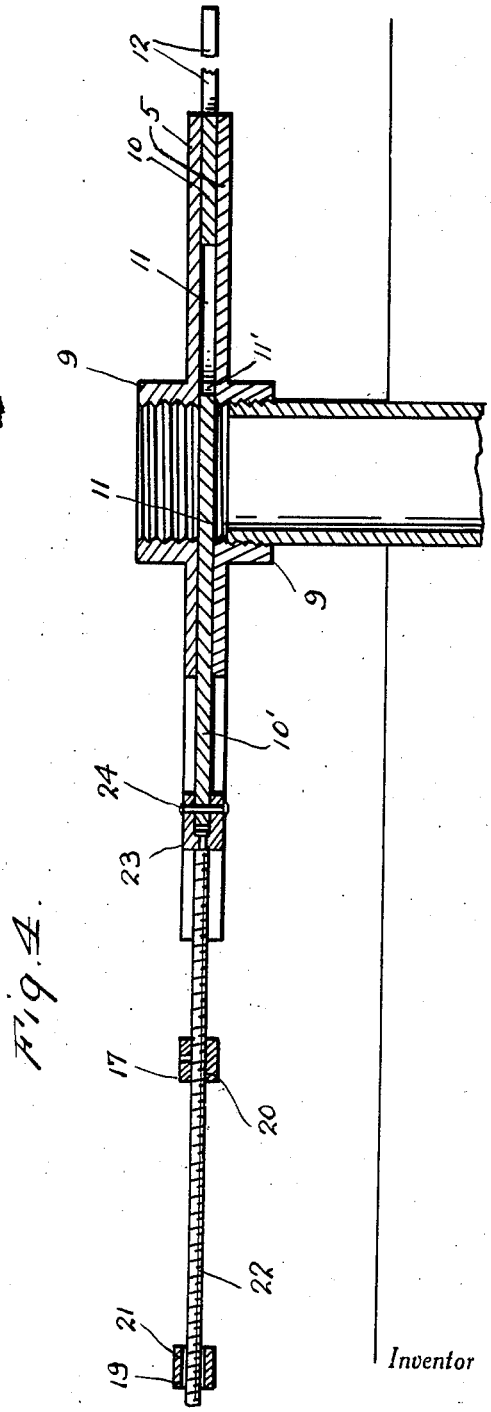
Inventor
R. M. Johnson
By Clarence A. O'Brien
Attorney

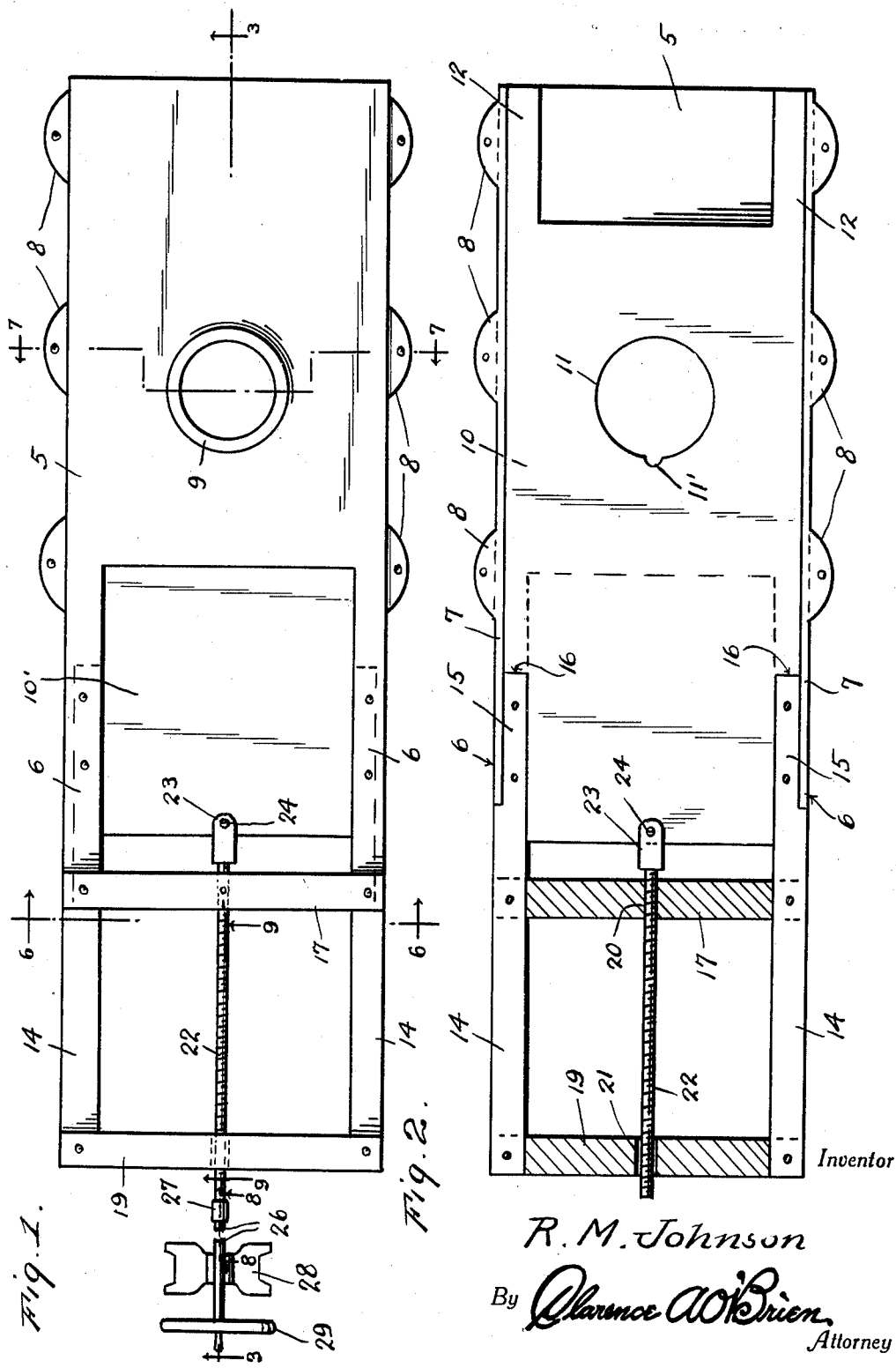

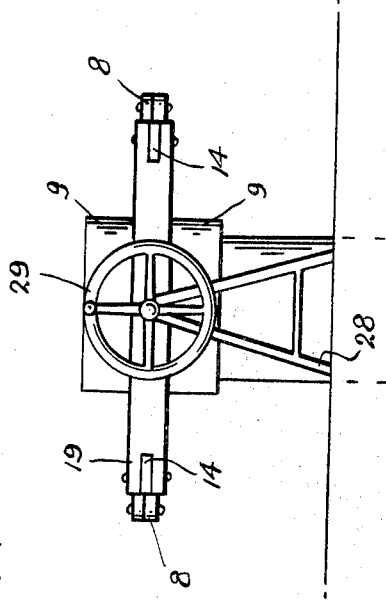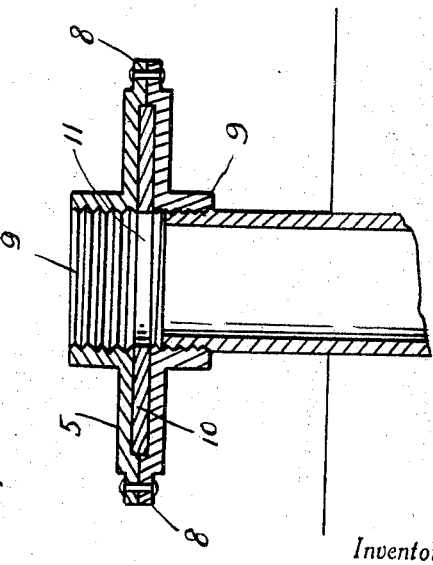

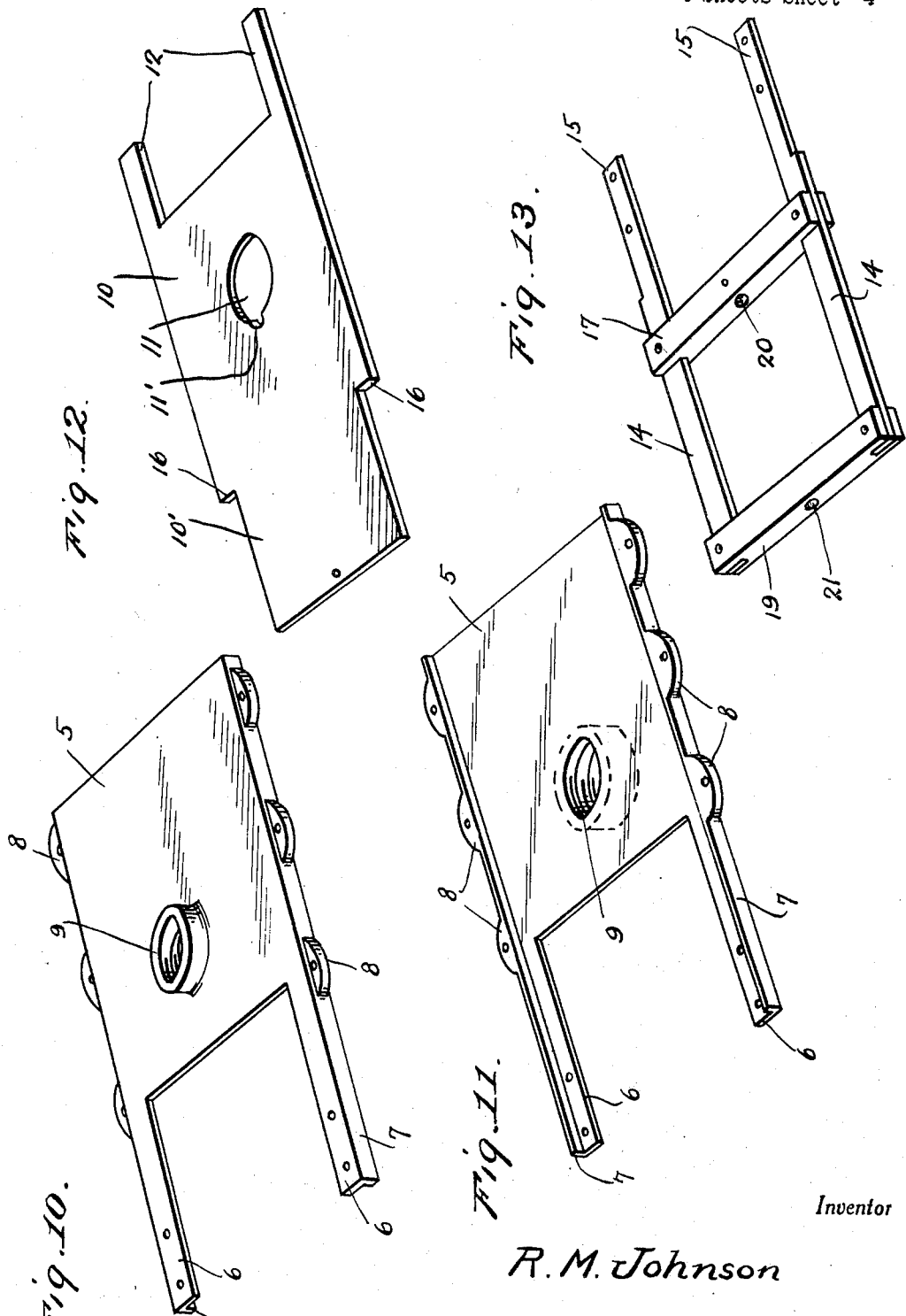

Patented Apr. 3, 1934

1,953,828

UNITED STATES PATENT OFFICE 1,953,828

VALVE FOR WELLS

Ray M. Johnson, Birch Run, Mich.

Application April 15, 1933, Serial No. 666,371

1 Claim. (Cl. 251—61)

The present invention relates to a valve for oil wells and the like and has for its prime object to provide a novel and efficient construction adapted for use in preventing the gushing of oil from the well.

Another very important object of the invention resides in the provision of a construction which may be operated while the cable or rope as ordinarily used to suspend the auger or drilling means is in place, to the end that the capping or operation of the valve may be more expeditious.

Another very important object of the invention resides in the provision of a novel structure whereby the valve may be actuated from a distance as in the case of fire.

A still further very important object of the invention resides in the provision of a valve of this nature which is comparatively simple in its construction, easy to manipulate, compact in its construction, and thoroughly reliable in operation.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of a valve embodying the features of my invention.

Figure 2 is a top plan view of the lower section thereof showing the frame with its cross bars in section.

Figure 3 is a vertical longitudinal section taken substantially on the line 3—3 of Figure 1.

Figure 4 is a similar view showing the valve closed.

Figure 5 is an end elevation.

Figure 6 is a sectional view taken substantially on the line 6—6 of Figure 1.

Figure 7 is a vertical transverse section taken substantially on the line 7—7 of Figure 1.

Figure 8 is a detail section taken substantially on the line 8—8 of Figure 1.

Figure 9 is a detail section taken substantially on the line 9—9 of Figure 1.

Figure 10 is a perspective view of the upper casing section.

Figure 11 is a perspective view of the lower casing section.

Figure 12 is a perspective view of the valve plate, and

Figure 13 is a perspective view of the guide frame.

Referring to the drawings in detail it will be seen that there are two casing sections of identical construction and interchangeable. Each section comprises a rectangular plate 5 having a pair of extensions 6 extending outwardly from one transverse edge. Rising from the longitudinal edges of the plate and the extension 6 or depending therefrom depending upon whether it is the lower or upper section, are flanges 7. Ears 8 project outwardly from the flanges 7 and are flush with the edges thereof. The sections are mounted one above the other and secured together by bolts or like fastening means extending through the ears 8. Openings are provided in the plates 5 and internally threaded necks 9 project outwardly therefrom in order that casing sections may be threadedly engaged therewith. A valve plate 10 is slidable between the plates 5 and has an opening 11 which may be brought into registry with the necks 9 as shown in Figure 3 or out of registry therewith as shown in Figure 4. A pair of extensions 12 project from one end of the valve plate 10 in spaced relation to each other and provide steadying means for the plate.

An extension 10' projects from the other edge of the plate and is slightly narrower than the plate.

A frame comprises a pair of longitudinal members 14 disposed in spaced parallelism and coextensive and having adjacent ends 15 narrowed so as to fit into the extensions 6 as best illustrated in Figure 2 and these ends are abuttable by the shoulders 16 formed at the juncture of the extension 10' with the plate 10. The ends 15 and the extensions 6 are secured together by suitable fastening means. Cross bars 17 and 19 are mounted between the members 14. The bar 17 has a central threaded opening 20. The bar 19 has an opening 21. A threaded shaft 22 is slidable through the opening 21 and threaded in the opening 20 and has a yoke 23 swiveled on the inner end thereof and secured to the extension 10' by a pin 24 or the like.

A threaded extension shaft 26 is coupled by suitable means as at 27 with the other end of the shaft 22 and is extended to a remote point and journaled through a bearing in the upper end of a suitable pedestal or post 28 and a hand wheel 29 is provided adjacent thereto. Obviously by turning the hand wheel 29 the valve plate may be moved to the open position shown in Figure 3 or to the closed position shown in Fig. 4. The plate opening 11 is provided with a nitch 11' to accommodate the cable or rope suspending the drilling means so that this will not interfere with the closing of the valve.

On putting my valve on an oil well casing, it is put on the casing underneath the drilling platform and is entirely out of the way. A piece of casing pipe can be screwed into the top neck to allow it to come flush with the drilling platform. This device may be used on any size casing by means of a suitable reducer. With my sliding valve plate there is no possible chance of any sediment of any kind getting in the way so that the sliding valve will not be able to be manipulated at any time it should become necessary to close the well because when the valve is open, it is protected on all sides and leaves a continuous hole for drilling and bailing.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A valve of the class described comprising a pair of casing sections each comprising an oblong plate having longitudinal marginal flanges projecting perpendicularly therefrom, the edges of the flanges being adapted to abut one another to hold the plates in spaced relation, ears on the flanges, and means for securing the ears together, said plates having openings, a valve plate slidable between the first mentioned plates and having an opening registrable with the first mentioned openings, angle shaped extensions on the casing plates forming guides for the valve plate, frame side members fixed in the extensions and extending outwardly in continuation thereof, said valve plate having that end which engages the extensions reduced in width to form shoulders at the sides of the valve plate, said shoulders engaging the inner ends of the side members to limit opening movement of the valve plate, cross members between the side members, a shaft extending through said cross members, said shaft having a threaded portion passing through a threaded hole in one of the cross members, whereby turning movement of the shaft produces a longitudinal movement of said shaft, means for coupling the shaft with the valve plate, and means for rotating the shaft.

RAY M. JOHNSON.